(No Model.) 2 Sheets—Sheet 2.
M. H. WILSON.
ELECTROLYTIC APPARATUS.
No. 556,038. Patented Mar. 10, 1896.
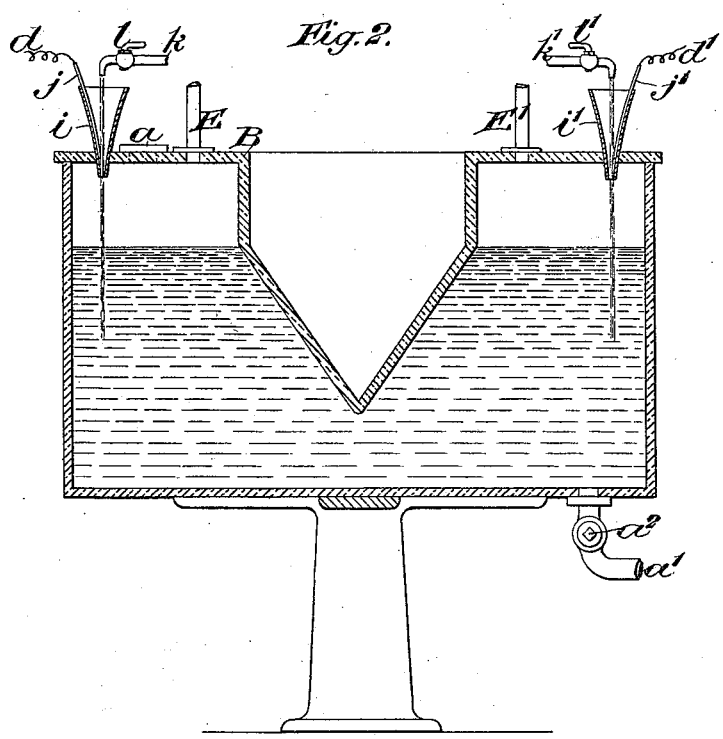
Witnesses:-
George Barry,
R. B. Suvard.
Inventor:-
Michael Hoffman Wilson
by attorneys
Brown & Seward

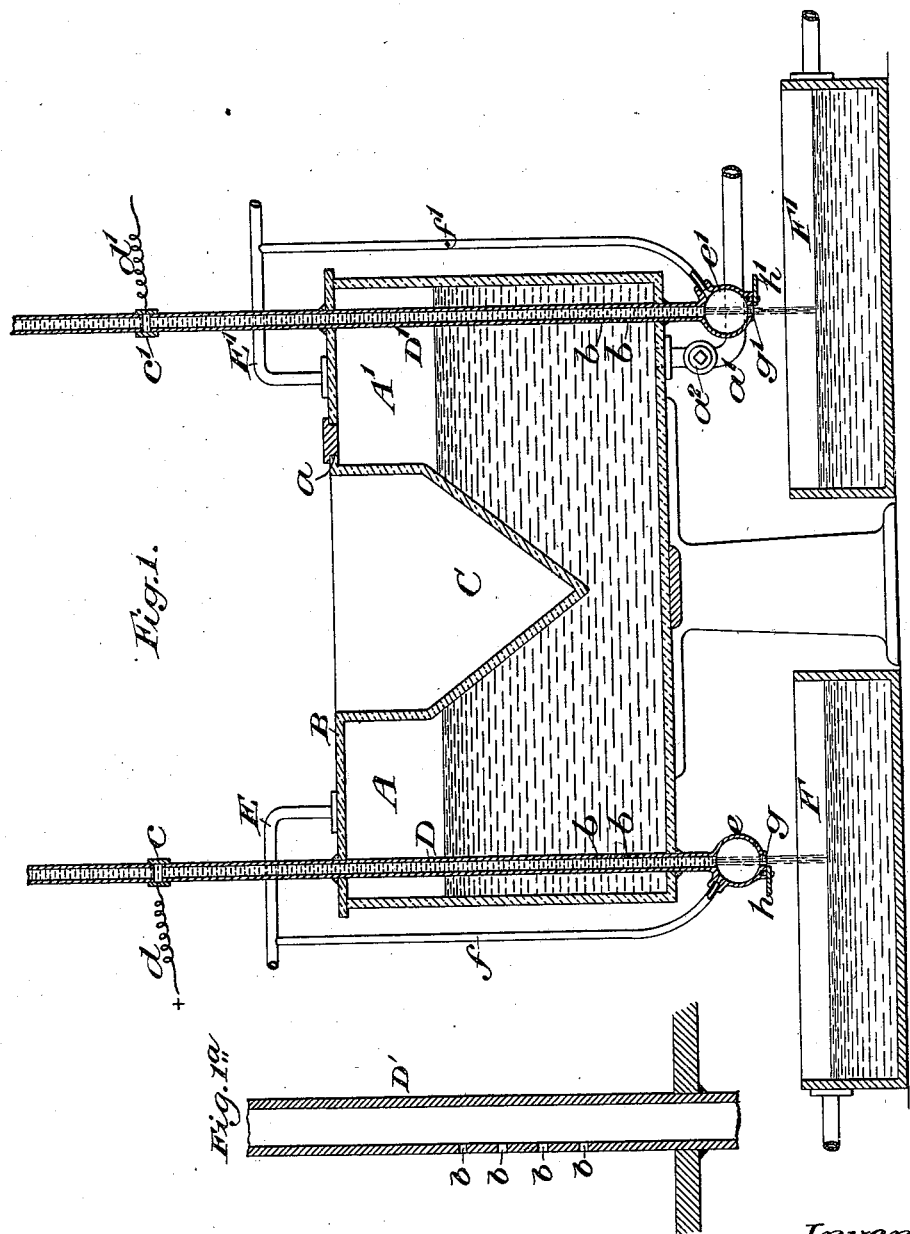

UNITED STATES PATENT OFFICE.

MICHAEL H. WILSON, OF BROOKLYN, NEW YORK.

ELECTROLYTIC APPARATUS.

SPECIFICATION forming part of Letters Patent No. 556,038, dated March 10, 1896.

Application filed May 8, 1895. Serial No. 548,498. (No model.)

*To all whom it may concern:*

Be it known that I, MICHAEL H. WILSON, of the city of Brooklyn, in the county of Kings and State of New York, have invented a new and useful Improvement in Electrolytic Apparatus, of which the following is a specification.

This invention relates generally to apparatus for the electrolytical decomposition of solutions of metallic salts, but is more especially designed for the decomposition of solutions of chloride of sodium to obtain caustic soda and chlorine. A serious practical difficulty which has been encountered in this process of obtaining caustic soda and chlorine from chloride of sodium has been the rapid destruction of the electrodes or poles of the electrolytic apparatus, especially the destruction of the anode or positive electrode. The object of my invention is to obviate this difficulty; and to this end my invention consists essentially in what I term a "water" electrode—that is to say, an electrode formed by a stream or column of water, which serves as a conducting medium through which the electric current enters or leaves the solution.

My invention further consists in certain details hereinafter described and claimed.

I will now proceed first to describe the invention in detail with reference to the accompanying drawings and afterward point out the novelty of the invention in claims.

Figure 1 of the drawings represents a vertical section of one example of an electrolytic apparatus embodying my invention. Fig. 1ª is an enlarged sectional view of part of one of the tubes shown in Fig. 1. Fig. 2 represents a vertical section of a second example of such an apparatus.

Similar letters of reference designate corresponding parts in all of the figures.

I will first describe the example of my invention illustrated in Fig. 1.

A A' B designate a covered tank, of any suitable material, divided into two compartments A and A' by a partition C extending from the cover B to within a short distance of the bottom. In the cover B of this tank is an opening $a$ for the introduction of the solution to be treated, and at its bottom the tank is furnished with a pipe $a'$ having a stopcock $a^2$ for drawing off the caustic alkali. The anode or positive electrode D is represented as in the compartment A and the cathode or negative electrode D' in the compartment A'. The compartment A, which receives the positive electrode, is furnished with a pipe E for the escape of the chlorine and the compartment A' with a pipe E' for the escape of the hydrogen.

The electrodes D D' are each represented as formed by a tube of glass or other non-conducting material, which is kept filled or supplied at its upper end from any suitable source with the water which constitutes the electrodes, the said tubes entering their respective compartments through suitable openings at the top and passing tightly through the bottom of the tank. The portions of the tubes within and near the bottom of the tank are perforated at intervals, as indicated at $b\ b$ (see Fig. 1ª) to form communication between the water in the tubes and the solution in the tank and thereby maintain an electric connection between the said water and the said solution. For the purpose of connecting the water of these electrodes with the dynamo or other source of electricity, the tubes D D' are made in sections separated at short distances and connected by metallic couplings $c\ c'$, and the terminals $d\ d'$ are connected with these metallic couplings.

At the lower ends of the electrode-tubes D D', which protrude through the bottom of the tank, are bulbs $e\ e'$, from which pipes $f f'$ extend to the escape-pipes of the respective compartments A A' of the tank, the said pipes $f f'$ being for the escape of gases evolved from portions of the solution which might enter into the water of the electrodes. In the bottoms of the bulbs $e\ e'$ are openings $g\ g'$, which form outlets for the water of the electrode-tubes, and below the said openings are arranged drip-pans or waste-tanks F F' for the collection of the waste water of the electrodes. The bulbs $e\ e'$ have valves $h\ h'$ fitted to their openings $g\ g'$ for the purpose of shutting off the escape of water when necessary.

In the example of my invention shown in Fig. 2 I dispense with tubes for the water electrodes and simply employ for each of such electrodes a small funnel $i\ i'$, of glass or other non-conducting material, inserted through the cover B of the tank, and into this funnel I insert a metallic conductor $j\,j'$, the end of which enters the throat of the said funnel. These conductors $j\,j'$ are connected respectively with the terminals $d\,d'$ of the dynamo or source of electricity. The funnels $i\,i'$ are supplied with the water which constitutes the electrodes through pipes $k\,k$, the flow of water being so controlled by stop-cocks $l\,l'$ in the said pipes as to supply the water in streams of sufficient quantity to conduct the electricity into the solution in the tank. In this example of my invention the water which constitutes the electrodes enters and mixes with the solution, but the quantity of water so introduced into the solution need not be sufficient to materially reduce its strength.

What I claim as my invention is—

1. An apparatus for electrolytic decomposition comprising a reservoir for the substance to be decomposed and electrodes connected with external electrical conductors and serving as conducting media through which the electric current enters or leaves the substance to be decomposed, said electrodes comprising a column or stream of water of relatively small diameter, and means for supplying said water column; substantially as described.

2. An apparatus for electrolytic decomposition comprising a reservoir for the substance to be decomposed and electrodes connected with external electrical conductors and serving as conducting media through which the electric current enters or leaves the substance to be decomposed, said electrodes comprising a column or stream of water of relatively small diameter, and a tube of non-conducting material inclosing said water column and having an opening into the tank with means for supplying water to said tube; substantially as described.

3. An apparatus for electrolytic decomposition comprising a reservoir for the substance to be decomposed and electrodes connected with external electrical conductors and serving as conducting media through which the electric current enters or leaves the substance to be decomposed, said electrodes comprising a column or stream of water of relatively small diameter, and a tube of non-conducting material inclosing said water column and having an opening into the tank with means for supplying water to said tube, and a pipe connected with the tube for the escape of gas therefrom; substantially as described.

MICHAEL H. WILSON.

Witnesses:
FREDK. HAYNES,
L. M. EGBERT.